Figure 1:
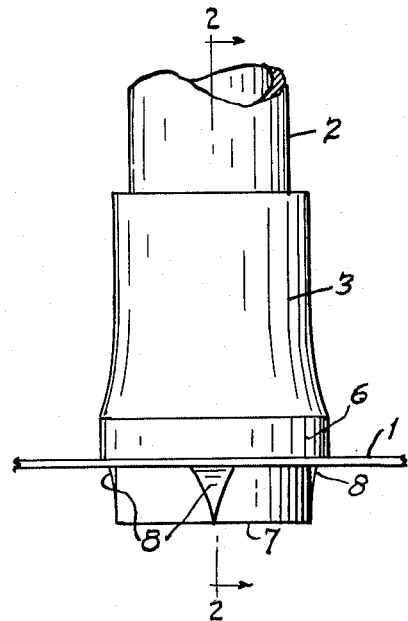

July 12, 1966 W. H. ALSUP 3,260,790
DEFORMABLE NON-METALLIC CONDUIT COUPLING
WITH GROUNDING CONNECTIONS
Filed Feb. 17, 1964 2 Sheets-Sheet 1

INVENTOR.
W. HOMER ALSUP.
BY
W. H. Atkinson
ATTORNEY

INVENTOR.
W. HOMER ALSUP.

United States Patent Office 3,260,790
Patented July 12, 1966

3,260,790
DEFORMABLE NON-METALLIC CONDUIT COUPLING WITH GROUNDING CONNECTIONS
W. Homer Alsup, 1537B 18th St., San Francisco, Calif.
Filed Feb. 17, 1964, Ser. No. 345,381
1 Claim. (Cl. 174—51)

My present invention relates to couplings and more particularly to a coupling for use with electrical circuit enclosing conduits and junction boxes.

An object of the invention is to provide a quick and easily mountable non-metallic coupling for connection metallic circuit enclosing conduits to a junction box or between coextending lengths of similar pipe in a novel manner and in which the coupling is established with a drive fit as distinguished from conventional threading and having current conducting elements to establish a grounding connection between the coupled metallic members.

A further object of the invention is to provide a coupling of vinyl plastic having an internal conduit engaging bore with spaced annular ribs which upon deformation will provide a vacuum tight joint between the coupling member and the external surface of a coupled length of conduit.

Another object of the invention is to provide a coupling member for attaching a tubular conduit member to the wall of a junction box having a projecting end with offset lugs for engagement with the interior wall of the conduit box for securing an associated length of conduit to the conduit box.

Another object of the invention is to provide a coupling member of plastic material having embedded grounding conductors with exposed ends to provide a circuit connection between spaced coextending lengths of conduit.

Other objects and advantages will be in part evident to those skilled in the art and in part pointed out hereinafter in connection with the accompanying drawing, wherein there is shown by way of illustration and not of limitation a preferred embodiment of the invention.

Figure 2:
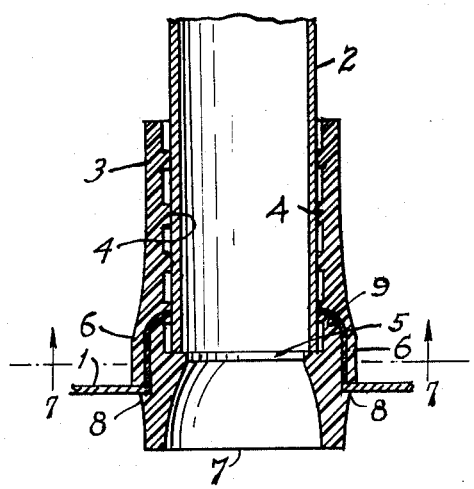
Figure 3:
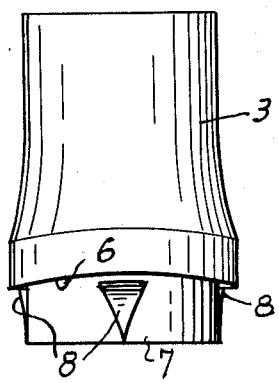
Figure 4:
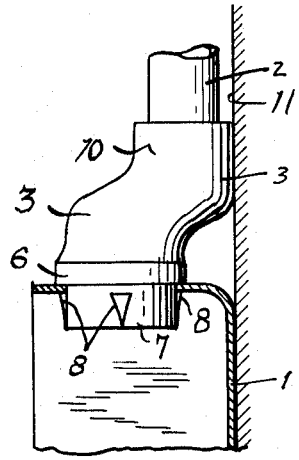
Figure 5:
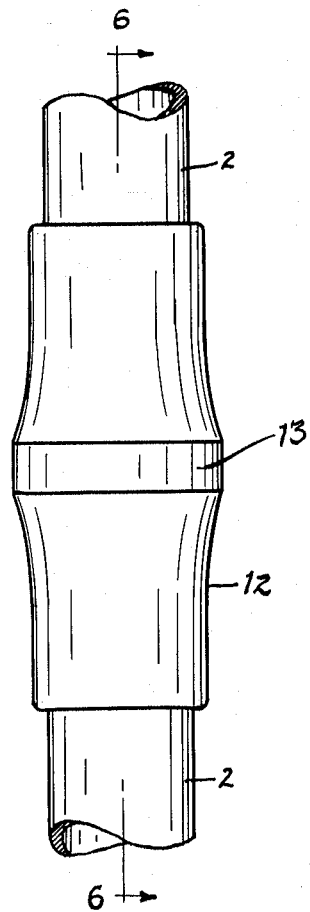
Figure 6:
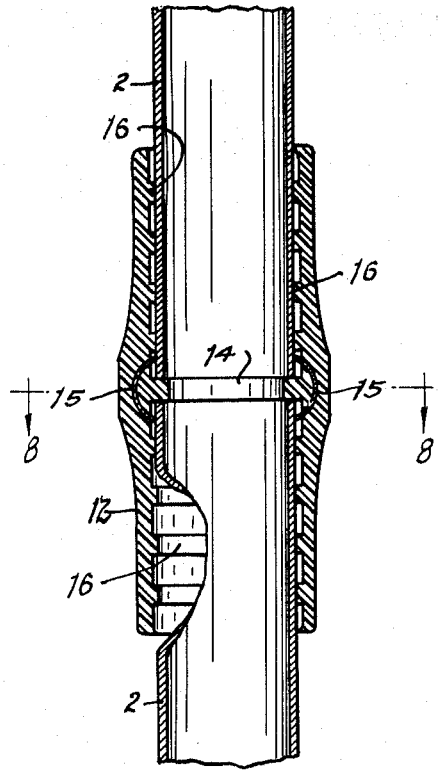
Figure 7:
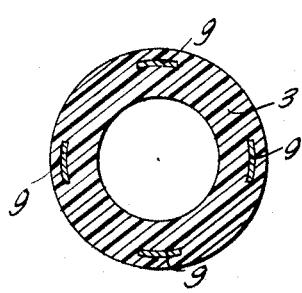
Figure 8:
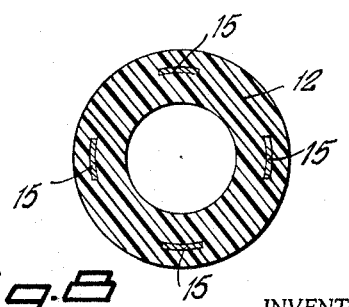

In the drawing, wherein like numerals refer to like parts throughout the several views:

FIGURE 1 is a fragmentary side view of a coupling constructed in accordance with my invention for attaching a length of conduit to the straight wall of a rectangular junction box, FIGURE 2 is a vertical sectional view of a coupling as shown in FIGURE 1, FIGURE 3 is a modified form of the coupling of FIGURE 1 for attaching a length of conduit to the cylindrical wall of a round junction box, FIGURE 4 is a modification showing the coupling of FIGURE 3 as having an offset, FIGURE 5 is a fragmentary side view of a coupling adapted for connecting two coextending lengths of conduit, and FIGURE 6 is a vertical sectional view of the coupling as shown in FIGURE 5, FIGURE 7 is a sectional view taken along line 7—7 of FIGURE 2 and FIGURE 8 is a sectional view taken along line 8—8 of FIGURE 6 looking in direction of arrows.

As illustrated in FIGURES 1 and 2 of the drawings, my improved coupling is intended for use in establishing a permanent attachment between the straight wall of a square junction box, designated by the numeral 1 and a length of tubular conduit 2 through which electrical conductors may be extended to the interior of the junction box. As here shown, the coupling has a body portion 3 having a central bore with axially spaced annular lugs or ribs 4 that will become deformed when the conduit 2 is driven thereinto. The body member 3 has a shoulder 5 against which the end of the length of conduit 2 will abut and extending outwardly at the base of the member 3 there is an external shoulder 6 that will engage with the outer surface of the junction box 1. Extending through a hole in the junction box 1 there is a cylindrical extension 7 having radially spaced barbs 8 that will engage and interlock with the inner surface of the junction box 1 when the coupling is mounted thereupon, as here shown. As is more particularly shown in FIGURE 2, the body portion of my coupling member 3 has a plurality of radially spaced current conducting members 9 of copper or the like, as shown in FIGURE 7, that are adapted at one end to make metallic contact with the conduit 2 and at their other ends to establish good electrical contact with the wall 1 of the junction box and thus complete a good grounding connection between the junction box 1 and the conduit 2.

The coupling as shown in FIGURE 3 is similar to that described above with the exception that the external shoulder 6 is rounded to engage with the cylindrical wall of a round junction box, and as shown in FIGURE 4, my improved coupling may also be formed with an offset 10, as here indicated, to dispose the length of conduit 2 closely adjacent a wall or other surface 11 upon which the junction box may be mounted.

Reference is now made to Sheet 2 of the drawings, where in FIGURES 5 and 6 there is shown a coupling member constructed in accordance with my invention for aligning and connecting together two coextending lengths of conduit tubing 2. This coupling, designated by the numeral 12, is substantially tubular in outline with a slight enlargement 13 intermediate the ends and at a point where there is an inwardly extending shoulder 14 against which the opposed end of the lengths of conduit 2 are adapted to engage. Embedded in the coupling 12 and outwardly from the shoulder 14 there is a plurality of metallic current conducting members 15 as shown in FIGURE 8, that are adapted and arranged to make contact with the ends of the two lengths of conduit 2 and thus provide an electrical ground establishing connection between these lengths of conduit.

Like the previously described embodiment the coupling member 12 has conduit accommodating bores with axially spaced annular lugs or ribs 16 that are adapted to become deformed when the ends of the lengths of conduit 2 are driven therein. In this manner there is provided a fluid and gas tight seal between the two lengths of conduit with a current conducting ground connection therebetween. Among the advantages of my invention, it may be added that the coupling members when formed of plastic, as here indicated, can be made relatively cheaper than comparable metallic couplings and due to the omission of the conventional pipe or screw threads at the ends thereof, the coupling can be driven over the end of a length of conduit by a mallet or like tool, or as an alternative the length of pipe may be driven into the coupling when the latter is mounted upon an installed junction box. A further advantage is that the coupling will provide a gas tight, fireproof and leakproof connection which will render the coupling suitable for use in connection with electrical circuits associated with gasoline and other combustible material pumping systems.

While I have, for the sake of clearness and in order to disclose my invention so that the same can be readily understood, described and illustrated a specific form and arrangement, I desire to have it understood that this invention is not limited to the specific forms disclosed, but may be embodied in other ways that will suggest themselves to persons skilled in the art. It is believed that this invention is new and all such changes as come within the scope of the appended claim are to be considered as part of this invention.

Having thus described my invention, what I claim and desire to secure by Letters Patent is:

A coupling for electrical circuit enclosing conduits, comprising a molded plastic body member with an extending cylindrical end for insertion through an opening in a junction box, radially spaced outwardly projecting barbs upon said extending end adapted and arranged to engage the inner wall of a metallic junction box and secure the same thereto, characterized by the fact that said member has an oppositely extending cylindrical portion having an internal bore with inwardly projecting ribs that will become deformed when a length of conduit is driven into said bore, and a metallic current conducting means embedded in said molded plastic body members exposed at points to form a grounding connection between a length of conduit driven into the cylindrical portion and the wall of a metallic junction box upon which the coupling is to be mounted.

References Cited by the Examiner

UNITED STATES PATENTS

| | | | |
|---|---|---|---|
| 2,077,686 | 4/1937 | Gober | 339—126 |
| 2,410,999 | 11/1946 | Reisner | 174—51 X |
| 2,503,169 | 4/1950 | Phillips | 285—382.7 X |
| 2,611,000 | 9/1952 | Cochran | 174—153 X |
| 3,101,205 | 8/1963 | Benham | 285—162 |

FOREIGN PATENTS

| | | |
|---|---|---|
| 147,951 | 8/1952 | Australia. |
| 1,201,761 | 1/1960 | France. |
| 1,203,962 | 1/1960 | France. |
| 925,743 | 3/1955 | Germany. |
| 566,279 | 12/1944 | Great Britain. |
| 588,072 | 5/1947 | Great Britain. |

LARAMIE E. ASKIN, *Primary Examiner.*

JOHN F. BURNS, ROBERT K. SCHAEFER,
*Examiners.*

W. B. FREDRICKS, J. F. RUGGIERO,
*Assistant Examiners.*